US011866965B2

(12) United States Patent
Frattini et al.

(10) Patent No.: US 11,866,965 B2
(45) Date of Patent: Jan. 9, 2024

(54) ELECTRONIC HANDLE FOR A VEHICLE DOOR

(71) Applicant: U-Shin Italia S.p.A., Pianezza (IT)

(72) Inventors: Massimo Frattini, Pianezza (IT); Anthony Guerin, Pianezza (IT); Antonio Rocci, Pianezza (IT); Thomas Devernois, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 161 days.

(21) Appl. No.: 17/443,629

(22) Filed: Jul. 27, 2021

(65) Prior Publication Data

US 2022/0034130 A1 Feb. 3, 2022

(30) Foreign Application Priority Data

Jul. 28, 2020 (EP) .................................... 20188181

(51) Int. Cl.
*E05B 85/16* (2014.01)
*E05B 81/50* (2014.01)

(52) U.S. Cl.
CPC .............. *E05B 85/16* (2013.01); *E05B 81/50* (2013.01)

(58) Field of Classification Search
CPC .......... E05B 85/10; E05B 85/16; E05B 81/50; E05B 85/14; E05B 81/76; E05B 81/90
USPC ............................................... 292/336, 336.3
See application file for complete search history.

(56) References Cited

U.S. PATENT DOCUMENTS

| | | | | |
|---|---|---|---|---|
| 2001/0005082 A1* | 6/2001 | Suparschi | E05B 85/18 | 292/347 |
| 2013/0221690 A1* | 8/2013 | Rocci | E05B 85/16 | 292/336.3 |
| 2016/0130845 A1* | 5/2016 | Park | E05B 77/06 | 292/336.3 |
| 2017/0030117 A1* | 2/2017 | Savant | E05B 85/14 | |
| 2018/0195320 A1* | 7/2018 | Cousin | E05B 15/0053 | |
| 2022/0243507 A1* | 8/2022 | Moriyama | E05B 85/107 | |

FOREIGN PATENT DOCUMENTS

| | | | |
|---|---|---|---|
| DE | 102014117005 | 5/2016 | |
| EP | 1816290 | 8/2007 | |
| EP | 1816290 A2 * | 8/2007 | E05B 81/76 |
| EP | 3141679 | 3/2017 | |

(Continued)

OTHER PUBLICATIONS

European Search Report for EP Application 2018181, dated Jan. 14, 2021.

*Primary Examiner* — Kristina R Fulton
*Assistant Examiner* — James Edward Ignaczewski
(74) *Attorney, Agent, or Firm* — Burris Law, PLLC

(57) ABSTRACT

An electronic handle for a vehicle door including an electronic device, an activation lever, and a bracket. The electronic device electronically activates a latch of the vehicle door. The activation lever is configured to rotate around an activation lever axis between a rest position in which the activation lever is released, and a mechanical activation position in which the activation lever is actuated for mechanically activating the latch of the vehicle door in case of default of the electronic device. The bracket receives the activation lever. The activation lever comprises a driving element pivotally connected to the activation lever, and the bracket comprises a flexible blade with a stop element.

18 Claims, 3 Drawing Sheets

(56) References Cited

FOREIGN PATENT DOCUMENTS

| | | | | |
|---|---|---|---|---|
| EP | 3179021 | | 6/2017 | |
| EP | 3179021 | A1 * | 6/2017 | ......... E05B 15/0053 |
| FR | 2802563 | | 6/2001 | |
| FR | 2802563 | A1 * | 6/2001 | ............. E05B 85/16 |

* cited by examiner

ELECTRONIC HANDLE FOR A VEHICLE DOOR

CROSS-REFERENCE TO RELATED APPLICATIONS

This application claims priority to and the benefit of EP 20188181.0, filed on Jul. 28, 2020. The disclosure of the above application is incorporated herein by reference.

FIELD

The present disclosure relates to an electronic handle for a vehicle door and a vehicle including such a handle.

BACKGROUND

The statements in this section merely provide background information related to the present disclosure and may not constitute prior art.

Electronic handles for vehicle doors generally include a switch configured to activate a latch mechanism, such as electronic latch, to unlatch the vehicle door.

Such electronic handles typically require a power source, such as a battery for example, to be useable. In case of loss of energy in the battery, the electronic handle is typically not useable and it is more difficult or not possible for a user to enter the vehicle.

Thus, there is a need for a back-up mechanical system that permits unlatching of the vehicle door when there is not enough energy in the battery for the electronic latch mechanism to function.

SUMMARY

This section provides a general summary of the disclosure and is not a comprehensive disclosure of its full scope or all of its features.

The present disclosure provides an electronic handle with a mechanical back up in case of loss of battery which is efficient and easy for the user to activate, and which is cost-effective.

To this end, the present disclosure provides an electronic handle for a vehicle door, including an electronic means or device, an activation lever, and a bracket. The electronic means electronically activates a latch of the vehicle door. The activation lever is configured for rotating around an activation lever axis between a rest position in which the activation lever is released, and a mechanical activation position in which the activation lever is actuated for mechanically activating the latch of the vehicle door in case of default of the electronic means. The bracket is configured to receive the activation lever. The activation lever includes a driving element pivotally connected to the activation lever. The bracket includes a flexible blade with a stop element. The driving element cooperates with the stop element such that when the activation lever is actuated from the rest position to the mechanical activation position, the driving element passes from a first side of the stop element corresponding to the rest position to a second side of the stop element when the activation lever reaches the mechanical activation position. When the activation lever comes back from the mechanical activation position to the rest position, the driving element pivots in order to allow the driving element to come back to the first side of the stop element.

Advantageously, the electronic handle of the present disclosure has a mechanical backup for opening the latch since the driving element and the stop element cooperate for the mechanical activation of the activation lever. Therefore, the handle of the present disclosure has an efficient, cost-effective and easy to use mechanical backup.

According to further forms which can be considered alone or in all possible combinations: the driving element (22) is pivotally connected to the activation lever (2), and when the activation lever (2) comes back from the mechanical activation position to the rest position, the driving element (22) pivots in order to allow the driving element (22) to come back to the first side of the stop element (32); the flexible blade (30) includes a first end (37) and a second end (38) opposite to the first end (37), the first end (37) being fastened to the bracket (3) and the second end (38) including the stop element (32); the stop element (32) is configured to stop the driving element (22) when the activation lever (2) is actuated by means of a first driving force, and the driving element (22) passes the stop element (32) when the activation lever (2) is actuated by means of a second driving force greater than the first driving force; the second driving force is equal or greater than 150 N; the activation lever (2) further has an electrical activation position between the rest position and the mechanical activation position, in which the activation lever (2) activates the electronic means (4) for unlatching the door; the electrical activation position is reached when the activation lever (2) is actuated by means of the first driving force; the driving element (22) pivots in order to allow the activation lever (2) to come back to the rest position when the activation lever (2) moves by inertia from the mechanical activation position to the rest position; the activation lever (2) is associated with return means or device (35), such as a compression spring, in order to move from the mechanical activation position to the rest position; the driving element (22) is associated with return means or device (25), such as a spring, in order to pivot to allow the activation lever (2) to come back from the mechanical activation position to the rest position; the return means (35) of the activation lever (2) have a stiffness superior to the stiffness of the return means (25) of the driving element (22); the stop element (32) includes a ramp (33) and the driving element (22) includes a surface configured to be in contact with the ramp (33) when the activation lever (2) moves from the rest position to the mechanical activation position, the ramp (33) having a straight surface configured to be in contact with the driving element (22); the flexible blade (30) is flexible in elastic deformation such that the driving element (22) bends the flexible blade (30) via the stop element (32) when the activation lever (2) moves from the mechanical activation position to the rest position; and the driving element (22) includes rolling means or device (23) in order to limit frictional forces between the driving element (22) and the stop element (32).

The present disclosure further relates to a vehicle including a door and an electronic handle as described above, fixed to the door.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
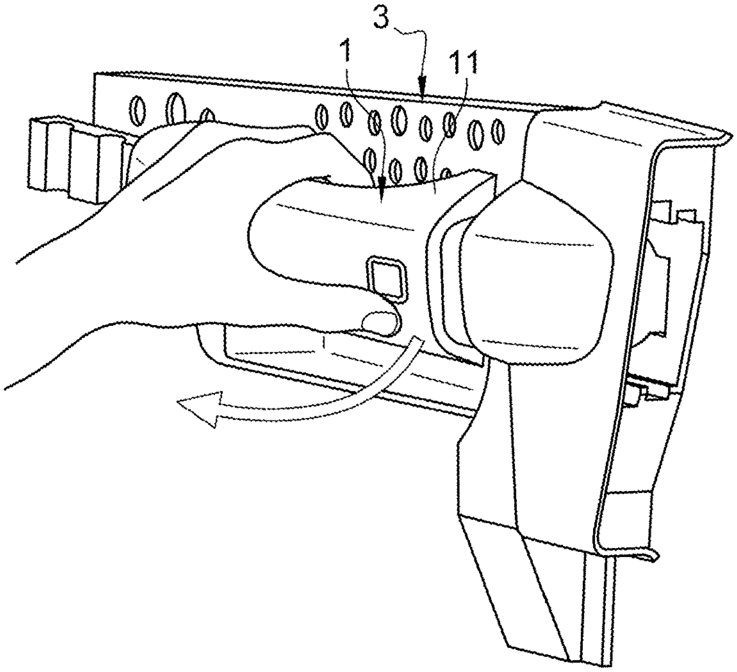
FIG. 1 is a perspective view of an electronic handle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
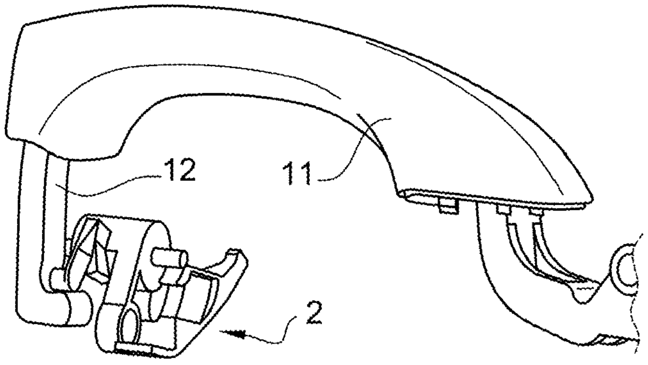
FIG. 2 is a perspective view of a handle lever of the electronic handle of FIG. 1 cooperating with an activation lever of the electronic handle.

Referring to FIGS. 1 and 2, the electronic handle of the present disclosure may include a handle lever 1 configured to be fixed in a vehicle door. The handle lever 1 is intended to be mounted on an exterior side of the vehicle door. The handle of the present disclosure may have other types of levers for activating the activation lever, which are rotatable according to an axis disposed in a different way.

In the present form, the handle lever 1 may include a gripping part 11 configured to be grasped by a user and pulled outwardly with respect to the vehicle door when the user wants to open the door. The handle lever 1 further may include a column 12 connected to the gripping part 11 and projecting internally to the vehicle door.

The handle further includes internal parts to be mounted at an interior side of the vehicle door. The internal parts are generally mounted on a bracket 3 such that the bracket 3 supports the internal parts. Another supporting piece may be used with the device of the present disclosure.

With reference to FIGS. 3 to 6, among the internal parts is an activation lever 2 cooperating with the handle lever 1 through the column 12 such that when the handle lever 1 is pulled, the handle lever 1 drives the activation lever 2 to move from a rest position (FIG. 3) to a mechanical activation position (FIG. 6) for activating a latch for example by pulling mechanically a Bowden cable.

As shown in FIGS. 3 to 6, the activation lever 2 is rotationally mounted about an activation lever axis 20. The activation lever 2 advantageously includes activation lever return means or device 35 such as a compression spring, in order to move from the mechanical activation position (FIG. 6) to the rest position (FIG. 3), when the handle lever 1 is released.

Figure 3:
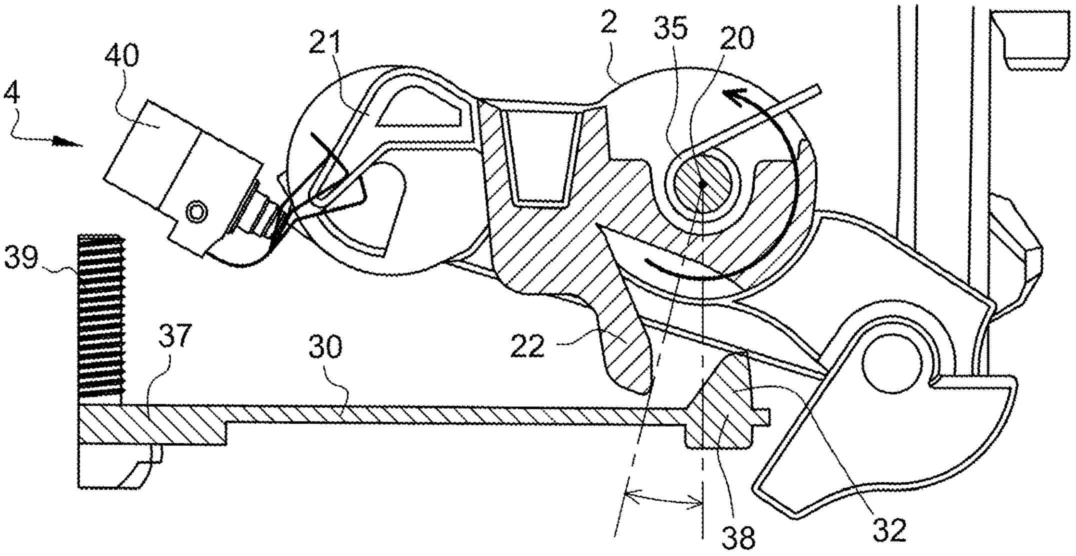
FIG. 3 is a cross-sectional view of an activation lever and a flexible blade of the electronic handle of FIG. 1 in a rest position.

In FIG. 3, the activation lever 2 is in the rest position. It is released from any activation.

As an electronic handle, the handle of the present disclosure includes electronic means or device 4 configured to cooperate with a latch. The electronic means 4 are configured to activate the latch through a signal. The latch in turn unlatches the vehicle door.

Figure 4:
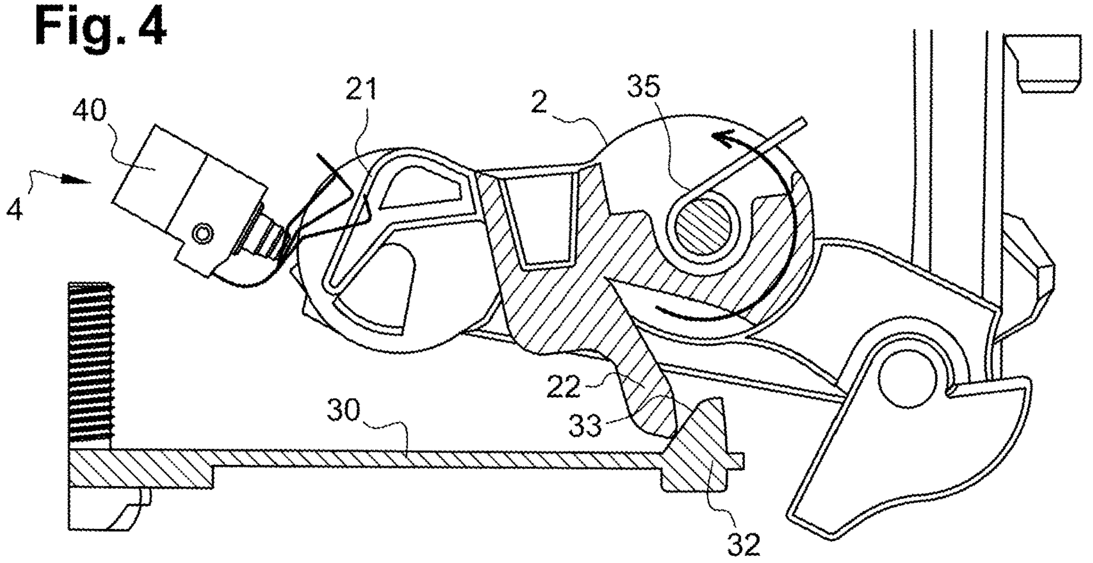
FIG. 4 is a cross-sectional view of the activation lever and the flexible blade of the electronic handle of FIG. 1 in an electrical activation position.

In one form, the electronic means 4 includes a switch 40 (FIGS. 3 and 4) and may include a circuit configured for example such that when the switch 40 is open, as illustrated in FIG. 4, electric current flows and activates the latch.

According to one form, the handle lever 1 and/or the activation lever 2 are configured to electronically activate the latch, for example by opening the switch 40. The electronic means 4 can be in contact with a surface 21 of the activation lever 2. Alternatively, the electronic means 4 can be in contact with a moving element of the handle connected to the activation lever 2 and/or the handle lever 1.

Alternatively, to the switch 40, a hall-effect device or a sensor (not shown) may be used as electronic means to command the latch.

According to another form, the handle lever 1 and/or the activation lever 2 may activate the electronic means 4.

As illustrated in FIG. 4, the activation lever 2 further has an electrical activation position between the rest position (FIG. 3) and the mechanical activation position (FIG. 6), in which the activation lever 2 activates the electronic means 4 for unlatching the door.

Figure 6:
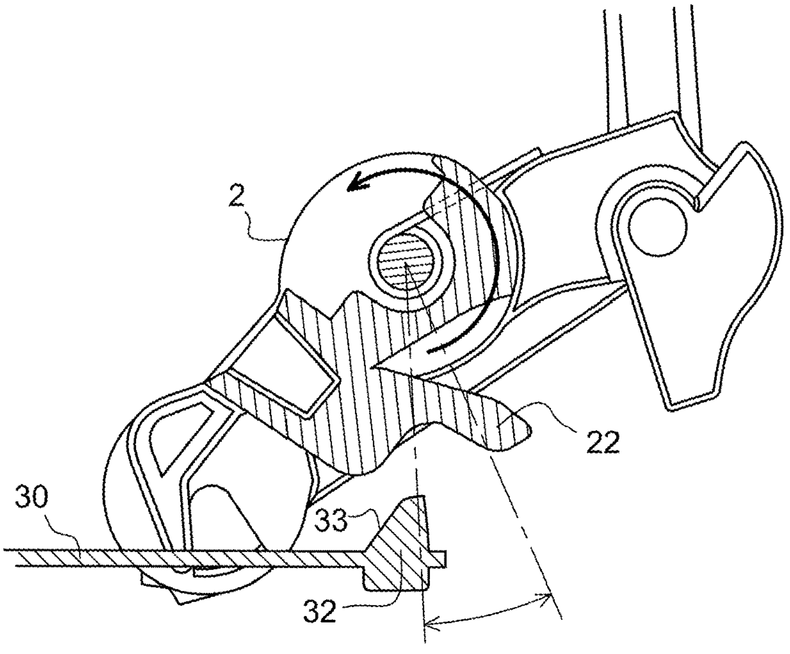
FIG. 6 is a cross-sectional view of the activation lever and the flexible blade of the electronic handle of FIG. 1 in the mechanical activation position.

According to another form, the activation lever 2 may be configured to be moved along a first stroke, such as a short stroke for example, to reach the electrical activation position. The activation lever 2 is further configured to be moved along a second stroke, such as a long stroke for example, to reach the mechanical activation position (FIG. 6). The mechanical activation position is, in one form, beyond the electrical activation position, and, in one particular form, with the same orientation thereof, with reference to the rest position.

According to a first variation of the present disclosure, the activation lever 2 includes a driving element 22 configured to cooperate with a stop element 32 disposed on a flexible blade 30 attached to the bracket 3. The driving element 22 is attached to the activation lever 2 and moves with the activation lever 2.

In one form, the stop element 32 is triangular-shaped.

When the activation lever 2 is activated from the rest position (FIG. 3) to the mechanical activation position (FIG. 6), the driving element 22 passes from a first side of the stop element 32 corresponding to an initial position (FIG. 3), to a second side of the stop element 32 corresponding to a final position (FIG. 6).

The electronic handle may be configured such that the activation lever 2 is moved from the rest position (FIG. 3) to the electrical activation position (FIG. 4) by means of a first driving force, for example lower than 150 N. The first driving force enables the stop element 32 to block the driving element 22 in an intermediate position between the initial position (FIG. 3) and the final position (FIG. 6). The driving element 22 in the intermediate position may be placed against the stop element 32.

The electronic handle may be configured such that the activation lever 2 is moved from the electrical activation position (FIG. 4) to the mechanical activation position (FIG. 6) by means of a second driving force greater than the first driving force, for example greater or equal to 150 N. The second driving force allows the driving element 32 to pass the stop element 32 in order to reach the second side of the stop element 32.

Figure 5:
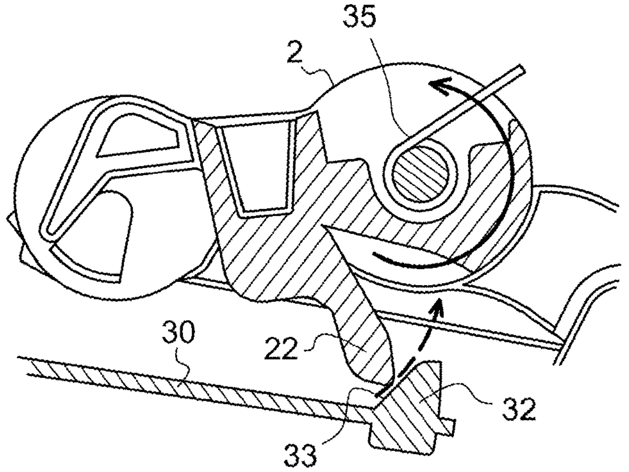
FIG. 5 is a cross-sectional view of the activation lever and the flexible blade of the electronic handle of FIG. 1 moving toward the mechanical activation position.

As illustrated in FIG. 5, the stop element 32 includes a ramp 33, and the driving element 22 includes a surface intended to be in contact with the ramp 33 when the activation lever 2 moves from the rest position to the mechanical activation position. The ramp 33 has a straight surface in contact with the driving element 22. Advantageously, when the driving element 22 is moving in contact with the ramp 33 in order to pass the stop element 32, the electronic handle needs an increased driving force.

The ramp 33 is placed at the first side of the stop element 32, and is configured to stop the driving element 22 when the activation lever 2 is activated with the first driving force. This position is the one used to activate the electronic latch.

When the activation lever 2 is activated with the second driving force, the driving element 22 is moved on the surface of the ramp 33 such that the driving element 22 passes the stop element 32 and the activation lever 2 reaches the mechanical activation position. This position is the one used to activate the mechanical backup.

Therefore, when the activation lever 2 is moved further to the mechanical activation position (FIG. 6) by means of the second driving force, the driving element 22 passes the stop element 32. The driving element 22 then reaches the mechanical activation position (FIG. 6).

More particularly, the second driving force allows the flexible blade 30 to undergo an elastic deformation (FIG. 5) in order to move from an initial position (FIGS. 3 and 4) to a bent position (FIG. 5) and then to go back to the initial position (FIG. 6). The stop element 32, which is disposed on the flexible blade 30, moves along with the flexible blade 30 to allow the driving element 22 to pass from the first side of the stop element 32 to the second side of the stop element 32. The stop element 32 works as a hard spot.

In one form, the flexible blade 30 includes a first end 37 and a second end 38 opposite to the first end 37. In one form, the first end 37 is attached to the bracket 3, such as by means of a screw 39, and the second end 38 includes the stop element 32.

The stop element 32 is moveable along with the flexible blade 30.

In one form, the second driving force is equal or greater than 150 N.

The driving element 22 is moveable in rotation along with the activation lever 2.

When the driving element 22 has reached the second side of the stop element 32, the flexible blade 30 return in the initial position (FIG. 6).

As illustrated in FIG. 6, when the driving element 22 is on the second side of the stop element 32, the activation lever 2 is free to rotate in order to mechanically activate the latch.

The driving element 22 is a protrusion, such as a parallelepiped or cylindrical finger for example. Advantageously, the driving element 22 has a continuous curved surface and is configured to roll on the ramp 33. The driving element 22 may be made of a plastic or a metallic material.

Figure 7:
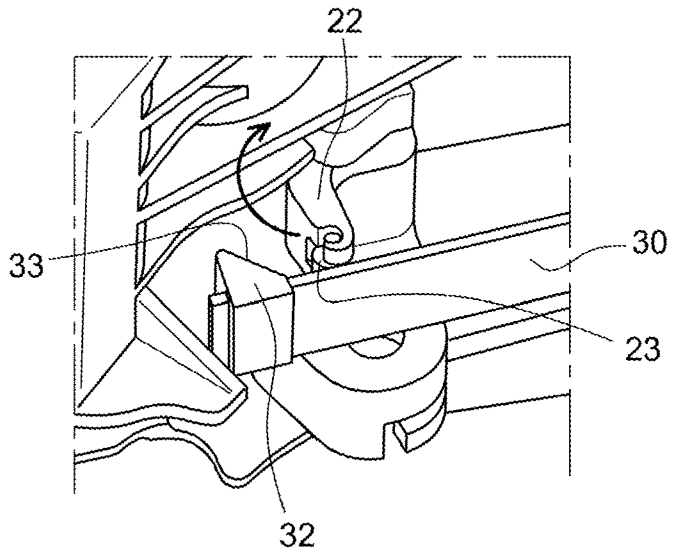
FIG. 7 is a perspective view of an activation lever and a flexible blade of an electronic handle according to another form.

Advantageously, as illustrated in FIG. 7, the driving element 22 includes rolling means or device 23 in order to limit the frictional forces when the driving element 22 is moving on the stop element 32.

Alternatively, the driving element 22 may slide on the ramp 33.

Alternatively, the driving element 22 may have the surface intended to be in contact with the ramp 33 covered by a layer reducing the friction between the driving element and the stop element 32.

Figure 8:
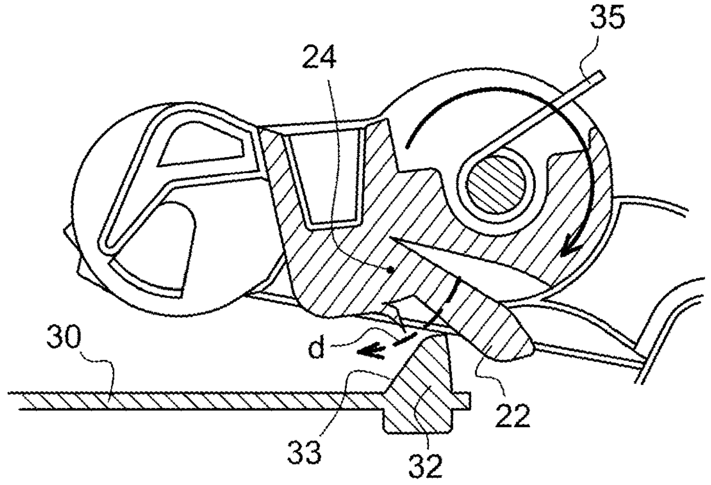
FIG. 8 is a cross-sectional view of the activation lever and the flexible blade of the electronic handle of FIG. 1 moving from the mechanical activation position toward the rest position.
Figure 9:
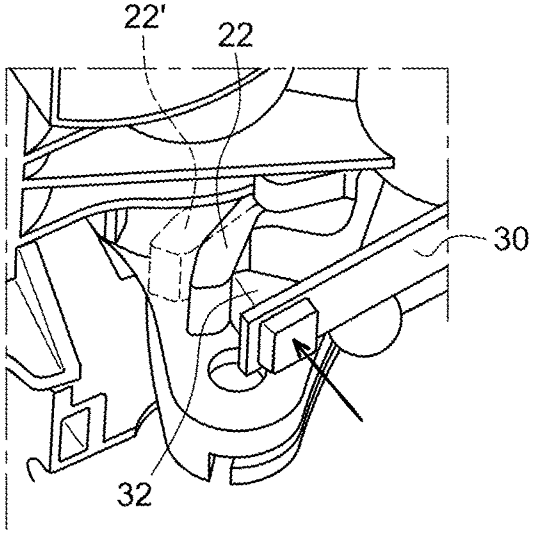
FIG. 9 is a perspective view of a portion of FIG. 8.
Figure 10:
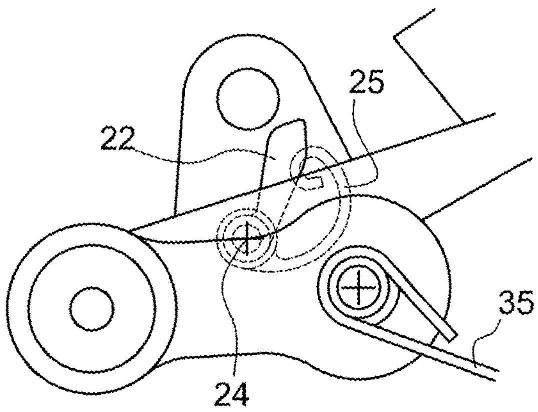
FIG. 10 is a cross-sectional view of the activation lever of the electronic handle of FIG. 1 showing a return means.

As illustrated in FIGS. 8 to 10, the driving element 22 is advantageously pivotally connected to the activation lever 2 about a driving element axis 24 (FIGS. 8 and 10), between a projecting position (the driving element 22 shown in the projecting position as solid lines in FIG. 9) and a retracted position (the driving element is shown in the retracted position as dashed lines in FIG. 9 and indicated with reference numeral 22'). In the retracted position, the driving element 22' is closer to the activation lever 2 than in the projecting position.

The driving element 22 is moveable from the projecting position to the retracted position when the activation lever 2 moves from the mechanical activation position to the rest position.

To this end, the driving element 22 includes return means or device 25 (FIG. 10), such as a compression spring for example, in order to move the driving element 22 from the projecting position to the retracted position, when the handle lever 1 is released.

The return means 25 of the driving element 22 allows the driving element 22 to pivot along direction d shown in FIG. 8. Therefore, the activation lever 2 comes back to the rest position (FIG. 3).

The return means 25 of the driving element 22 is configured to urge the driving element 22 towards the retracted position.

When the handle is released, the return means 35 of the activation lever 2 allows the activation lever to move from the mechanical activation position to the rest position, and the return means 25 of the driving element 22 allows the driving element 22 to move from the projecting position to the retracted position.

The return means 25 of the driving element 22 allows an automatic mechanical returning of the driving element 22 to the retracted position.

The return means 35 of the activation lever 2 and the return means 25 of the driving element 22 are in contact with each other. The return means 35 of the activation lever 2 has a stiffness greater than the stiffness of the return means 25 of the driving element 22.

Advantageously, due to the pivoting driving element 22, the activation lever 2 is not blocked by the stop element 32 when returning to the rest position.

Advantageously, the activation lever return means 35 of the activation lever 2 allows an automatic mechanical returning of the activation lever 2 to the rest position.

In addition, the return means 35 of the activation lever 2 allows the driving element 22 to be moved towards the retracted position. Therefore, the driving element 22 can pass from the second side of the stop element 32 to the first side of the stop element 32, without contact with the stop element 32 or with limited contact with the stop element 32. When the driving element 22 is in the retracted position, the stop element 32 does not block the driving element 22, and thus does not block the activation lever 2 from coming back in the rest position.

Advantageously, the electronic handle of the present disclosure allows a blocking position when the handle lever 1 is pulled with the first driving force. This blocking position corresponds to the electrical activation of the latch in particular by the activation lever 2, as shown in FIG. 4. In this position, the activation can be made by the activation lever 2 associated to the electronic means 4.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electronic handle for a vehicle door, comprising:

an electronic device for electronically activating a latch of the vehicle door;

an activation lever configured to rotate around an activation lever axis between a rest position in which the activation lever is released, and a mechanical activation position in which the activation lever is actuated for mechanically activating the latch of the vehicle door in case of default of the electronic device; and a bracket configured to receive the activation lever, wherein the activation lever comprises a driving element pivotally connected to the activation lever, and the bracket comprises a flexible blade with a stop element, the driving element cooperating with the stop element such that when the activation lever is actuated from the rest position to the mechanical activation position, the driving element passes from a first side of the stop element corresponding to the rest position to a second side of the stop element when the activation lever reaches the mechanical activation position, and wherein the flexible blade is flexible in elastic deformation such that the driving element bends the flexible blade via the stop element when the activation lever moves from the mechanical activation position to the rest position.

2. The electronic handle according to claim 1, wherein the driving element is pivotally connected to the activation lever, and configured such that when the activation lever comes back from the mechanical activation position to the rest position, the driving element pivots in order to allow the driving element to come back to the first side of the stop element.

3. The electronic handle according to claim 1, wherein the flexible blade comprises a first end and a second end opposite to the first end, the first end being fastened to the bracket and the second end comprising the stop element.

4. The electronic handle according to claim 1, wherein the stop element is configured to stop the driving element when the activation lever is actuated by a first driving force, and the driving element passes the stop element when the activation lever is actuated by a second driving force greater than the first driving force.

5. The electronic handle according to claim 4, wherein the second driving force is equal or greater than 150 N.

6. The electronic handle according to claim 1, wherein the activation lever further has an electrical activation position between the rest position and the mechanical activation position in which the activation lever activates the electronic device for unlatching the door.

7. The electronic handle according to claim 6, wherein the electrical activation position is reached when the activation lever is actuated by a first driving force.

8. The electronic handle according to claim 1, wherein the driving element pivots in order to allow the activation lever to come back to the rest position when the activation lever moves by inertia from the mechanical activation position to the rest position.

9. The electronic handle according to claim 1, wherein the activation lever is associated with an activation lever return device in order to move from the mechanical activation position to the rest position.

10. The electronic handle according to claim 9, wherein the driving element is associated with a driving element return device in order to pivot to allow the activation lever to come back from the mechanical activation position to the rest position.

11. The electronic handle according to claim 10, wherein the activation lever return device has a stiffness greater than a stiffness of the driving element return device.

12. The electronic handle according to claim 10, wherein the driving element return device is a spring.

13. The electronic handle according to claim 9, wherein the activation lever return device is a compression spring.

14. The electronic handle according to claim 1, wherein the stop element comprises a ramp and the driving element comprises a surface configured to be in contact with the ramp when the activation lever moves from the rest position to the mechanical activation position, the ramp having a straight surface configured to be in contact with the driving element.

15. The electronic handle according to claim 1, wherein the driving element comprises a rolling device in order to limit frictional forces between the driving element and the stop element.

16. A vehicle comprising a door and an electronic handle according to claim 1 fixed to the door.

17. The electronic handle according to claim 1, wherein the driving element is associated with a driving element return device in order to pivot to allow the activation lever to come back from the mechanical activation position to the rest position.

18. The electronic handle according to claim 17, wherein the driving element return device is a spring.

* * * * *